(12) United States Patent
Haseeb et al.

(10) Patent No.: US 12,684,166 B2
(45) Date of Patent: Jul. 14, 2026

(54) BIFURCATED TRANSMISSION OF 3D DATA ENCODED AS OCTREES

(71) Applicant: Nokia Solutions and Networks Oy, Espoo (FI)

(72) Inventors: Muhammad Haseeb, New York, NY (US); Eugene Chai, Murray Hill, NJ (US); Matteo Varvello, Holmdel, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 294 days.

(21) Appl. No.: 18/512,426

(22) Filed: Nov. 17, 2023

(65) Prior Publication Data

US 2025/0168401 A1 May 22, 2025

(51) Int. Cl.
H04N 19/597 (2014.01)
G06T 17/00 (2006.01)
H04N 19/96 (2014.01)

(52) U.S. Cl.
CPC ........... H04N 19/597 (2014.11); G06T 17/00 (2013.01); H04N 19/96 (2014.11)

(58) Field of Classification Search
CPC ...... H04N 19/597; H04N 19/96; G06T 17/00; G06T 9/001; G06T 9/40
See application file for complete search history.

(56) References Cited

U.S. PATENT DOCUMENTS

2024/0430318 A1* 12/2024 Han .................... H04L 65/1108

FOREIGN PATENT DOCUMENTS

CN 105446338 B 4/2017

OTHER PUBLICATIONS

Tari, Progressive View-Dependent Transmission of 3D Models Over Lossy Networks, 2005, 13th European Signal Processing Conference, Antalya, Turkey, 2005, pp. 1-4 (Year: 2005).*
(Continued)

*Primary Examiner* — Oneal R Mistry
*Assistant Examiner* — Justin Philip Cascais
(74) *Attorney, Agent, or Firm* — Mendelsohn Dunleavy, P.C.; Steve Mendelsohn

(57) ABSTRACT

In certain embodiments, higher-level octree telepresence data for a point cloud of a 3D object is transmitted using a reliable transport mechanism that ensures successful transmission, e.g., via re-transmission of dropped packets, and lower-level octree data for the point cloud is transmitted using a non-reliable transport mechanism that does not guarantee successful transmission. When the lower-level data is contained in one or more of the bottom-most layers in the octree representation, at least some of the point cloud might be able to be reconstructed using successfully received data even when some lower-level data is lost and not re-transmitted. Using non-reliable transmission can reduce latency by avoiding time-consuming re-transmissions. The resulting reconstructed point cloud will be incomplete, but it might be sufficiently complete to provide satisfactory user experience with lower latency that using reliable transport for the entire octree.

18 Claims, 3 Drawing Sheets

(56)           References Cited

OTHER PUBLICATIONS

Lee, Kyungjin, et al. "GROOT: A Real-time Streaming System of High-Fidelity Volumetric Videos." Proceedings of the 26th Annual International Conference on Mobile Computing and Networking. Sept. 21-25, London, U.K. (2020): 1-14.

Fitzek, Frank, et al. "Video Streaming in Wireless Internet." In Mobile Internet: Enabling Technologies and Services URL: <https://faculty.engineering.asu.edu/mre/wp-content/uploads/sites/31/2020/02/video_book.pdf> (2004): 1-102.

Larzon, Lars-Åke, et al. "UDP Lite for Real Time Multimedia Applications." Hewlett-Packard Laboratories. URL: <http://shiftleft.com/mirrors/www.hpl.hp.com/techreports/1999/HPL-IRI-1999-001.pdf> (1999): 1-6.

Otta, Maxmilian. "Why Does RTP Use UDP Instead of TCP? | Baeldung on Computer Science." 2023 [retrieved on Feb. 16, 2024] Retrieved from Internet: <URL: www.baeldung.com/cs/rtp-use-udp-vs-tcp> (6 pages).

Schnabel, Ruwen, et al. "Octree-based Point-Cloud Compression." Proceedings of the 3rd Eurographics conference on Point-Based Graphics. Jul. 2006. Boston, Massachusetts, USA. (2006): 111-121.

Han, Bo, et al. "ViVo: Visibility-Aware Mobile Volumetric Video Streaming." Proceedings of the 26th Annual International Conference on Mobile Computing and Networking. Sep. 21-25, London, U.K. (2020): 1-13.

Hosseini, Mohammad, et al. "Dynamic Adaptive Point Cloud Streaming." Proceedings of the 23rd Packet Video Workshop. Jun. 12-15, 2018. Amsterdam, Netherlands (2018): 1-7.

Van Der Hooft, Jeroen, et al. "Towards 6DoF HTTP Adaptive Streaming Through Point Cloud Compression" Proceedings of the 27th ACM International Conference on Multimedia. Oct. 21-25, 2019. Nice, France (2019): 2405-2413.

Winstein, Keith, et al. "Stochastic Forecasts Achieve High Through-put and Low Delay over Cellular Networks." 10th USENIX Symposium on Networked Systems Design and Implementation Apr. 2-5, 2013. Lombard, IL, USA. (2013): 459-471.

IETF, "QUIC: A UDP-Based Multiplexed and Secure Transport." RFC 9000, Internet Engineering Task Force. ISSNN: 2070-1721 (May 2021): 1-151.

Chang, Hong, et al. "Super-Resolution Through Neighbor Embedding." Proceedings of the 2004 IEEE Computer Society Conference on Computer Vision and Pattern Recognition, Jun. 27-Jul. 2, 2004. Washington, DC, USA. (2004): 1-8.

Yang, Jianchao, et al. "Image Super-Resolution via Sparse Representation." IEEE Transactions on Image Processing 19.11 (2010): 2861-2873.

Lawrence, Jason, et al. "Project Starline: A high-fidelity telepresence system." ACM Transactions on Graphics (TOG) 40.6 (2021): 1-16.

Orts-Escolano, Sergio, et al. "Holoportation: Virtual 3D Teleportation in Real-time." Proceedings of the 29th Annual Symposium on User Interface Software and Technology. Oct. 16-19, 2016. Tokyo, Japan (2016): 741-754.

"What is the User Datagram Protocol (UDP/IP)? | Cloudflare", www.cloudflare.com, 2018 [retrieved on Feb. 16, 2024] Retrieved from the Internet: <URL: https://www.cloudflare.com/learning/ddos/glossary/user-datagram-protocol-udp/ > (5 pages).

IETF, "Transmission Control Protocol." RFC 793, Internet Engineering Task Force. DOI: 10.17487/RFC0793 (Sep. 1981): 1-91.

Search report for corresponding European application No. 24211536.8-1207, dated Apr. 2, 2025 (10 pages).

Tar, B., et al. "Progressive view-dependent transmission of 3D models over lossy networks." 2005 13th European Signal Processing Conference. IEEE, 2005. p. 1-4.

Kumar, Swarun, Shyamnath Gollakota, and Dina Katabi. "A cloud-assisted design for autonomous driving." Proceedings of the first edition of the MCC workshop on Mobile cloud computing. 2012.

* cited by examiner

110

120

130

| INDEX | 0 | 1 | 2 | 3 | ... |
|---|---|---|---|---|---|
| NODE | ROOT | NODE 1 | NODE 2 | NODE 3 | ... |
| OCCUPANCY BYTE | 00100010 | 00011100 | 10110000 | 00010100 | |

<u>300</u>

<u>400</u>

402
TRX

404
CPU

406
MEM

BIFURCATED TRANSMISSION OF 3D DATA ENCODED AS OCTREES

BACKGROUND

Field of the Disclosure

The present disclosure relates to the representation of 3D data, such as (without limitation) 3D telepresence data, encoded as octrees.

Description of the Related Art

This section introduces aspects that may help facilitate a better understanding of the disclosure. Accordingly, the statements of this section are to be read in this light and are not to be understood as admissions about what is prior art or what is not prior art.

Live three-dimensional (3D) telepresence provides unprecedented immersion and interactiveness, overcoming fundamental limitations of prior two-dimensional video-based communication. This technology captures the user and their surroundings in 3D media format—generally called point clouds—and streams it to one or multiple remote users who enjoy the media with 6 degrees-of-freedom, i.e., the number of axes that a rigid body can freely move in a 3D space.

The point cloud for a 3D object is commonly encoded with a well-known hierarchical data structure called an octree. An octree partitions the 3D space into octants, which are cubic regions that can further be subdivided into eight smaller octants. The octree recursively divides space until a desired level of detail or a termination condition is reached. When octree representation of a 3D object is successfully transmitted from a transmitting source to a receiving destination, the destination is able to decode the received octree to reconstruct the point cloud of the original 3D object with a resolution equivalent to the smallest octants represented in the octree.

Octree decoding is sensitive to data losses. For this reason, conventional octree transmission requires a reliable transport mechanism, such as the Transmission Control Protocol (TCP). TCP is inherently reliable, as it strives to successfully deliver all data from source to destination and recover any lost data (i.e., packet drops) along the way. In the presence of network disruptions, packet losses increase. The side effect of TCP reliability is that, as it tries to recover all lost packets, TCP can potentially delay the rendering of point clouds, detracting from the user experience.

For example, although octree representation can reduce the amount of data needed to represent the point cloud of a 3D object, when a source transmits 3D telepresence data using a reliable transport mechanism, the destination might request the source to re-transmit any missing or corrupted data. As such, when network disruptions are significant, the resulting latency in reliably receiving and decoding the octree data at the destination can be sufficiently large to negatively impact the user experience of viewing the reconstructed imagery at the destination.

SUMMARY

Conventional transmission of 3D spaces (encoded as octrees) between two endpoints requires a reliable transport protocol like TCP. This requirement is due to the nature of octrees which cannot tolerate losses, i.e., even the loss of a single bit can invalidate the full octree. The downside of this requirement is that TCP reliability can slow down data transmission, thus impacting the quality of user experience. The present disclosure proposes a novel method for octree transmission, which does not require reliable data transmission for all octree data. While perfect decoding might not be achievable in the presence of arbitrary data losses, it is still possible to strategically discard some data, for which non-reliable communication is allowed. This technique aims to facilitate successful decoding while concurrently improving user experience in the presence of challenging network conditions and/or limited device capabilities.

Problems in the prior art are addressed in accordance with the principles of the present disclosure by a source transmitting to a destination higher-level octree data using a reliable transport mechanism that, for example, supports re-transmission of lost/corrupted data, while lower-level octree data is transmitted by the source using a less-reliable transport mechanism that does not require re-transmission of lost/corrupted data. In certain implementations, when some of the lower-level octree data that was not reliably transported is lost or corrupted, the destination is still able to at least partially recover the point cloud of the original 3D object using (i) the higher-level octree data that was reliably transported and (ii) possibly at least some of the successfully received lower-level octree data.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

In octree representation, a 3D space containing a 3D object is represented by a series of increasingly smaller octants, where each higher-level octant is equally divided into eight smaller octants in the next lower level, with each lower-level octant being represented in the octree if the lower-level octant includes a portion of the object's point cloud. If a lower-level octant does not include a portion of the object's point cloud, then that octant is not included in the octree.

The 3D space corresponding to an N-level octree for a 3D object comprises a highest-level (i.e., Level 0) root octant corresponding to the entire 3D space. The next level (i.e., Level 1) of the octree corresponds to those octants of the root octant that include at least a portion of 3D object's point cloud, and so on, down to the last level (i.e., Level (N–1)), which represents the highest-resolution data for the 3D object in the octree.

Figures 1A, 1B, 1C:
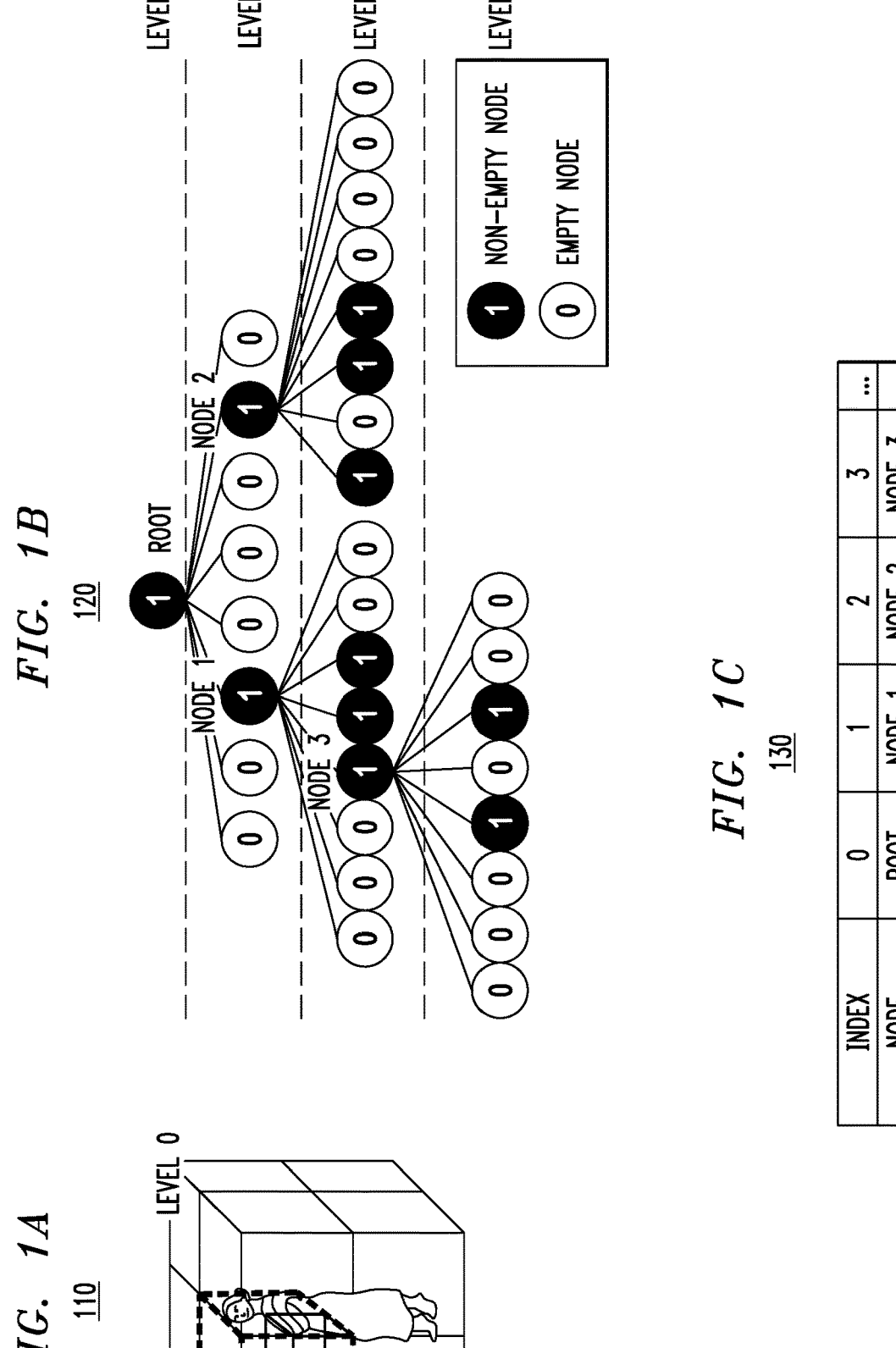
FIGS. 1A-1C represent a simple example of octree representation.
Figures 3, 4:
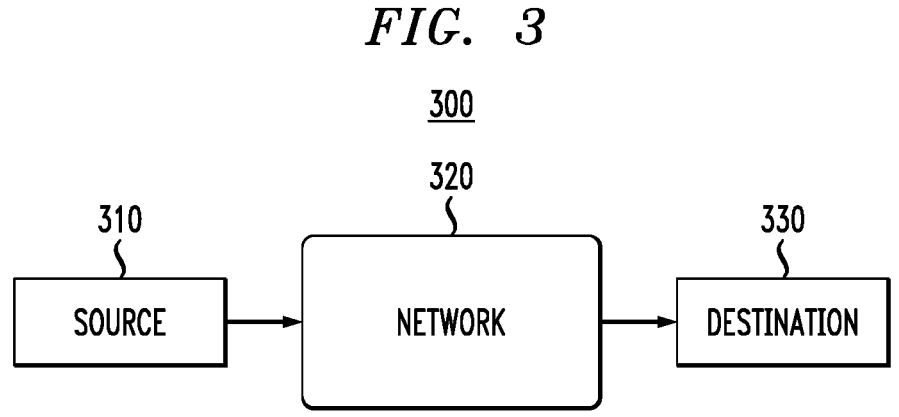
FIG. 3 is a simplified block diagram of a system according to certain embodiments of the present disclosure.
FIG. 4 is a simplified hardware block diagram of an example component that can be used to implement each of the source and the destination of FIG. 3.

FIGS. 1A-1C, which are based on FIG. 4 from Kyungjin Lee et al., "GROOT: A Real-time Streaming System of High-Fidelity Volumetric Videos," MobiCom '20, Sep. 21-25, 2020, London, United Kingdom, ACM ISBN 978-1-4503-1/20/09, represent a simple example of octree representation. In particular, FIG. 1A represents a cubic space 110 containing a 3D object (i.e., in this case, the 3D image of a woman), where the cube 110 corresponds to the Level 0 node in the octree representation. That cube 110 is equally divided into eight cubic octants, each of which corresponds to a Level 1 node in the octree representation, and each of those octants is itself equally divided into eight cubic octants, each of which corresponds to a Level 2 node in the octree representation, and so on down to Level N–1 (not shown in FIG. 1A) for an N-level octree representation.

FIG. 1B is a graphical representation of the octree 120 for FIG. 1A. As shown in FIG. 1B, Level 0 has a single node (called the root node), which has a value of 1 indicating that the 3D object is contained within the cube 110 of FIG. 1A.

Level 1 has eight nodes, each corresponding to a different octant of the Level 0 octant. Each Level 1 node has (i) a value of 1 if the corresponding Level 1 octant contains at least a portion of the 3D object's point cloud and (ii) a value of 0 if it does not. A node that corresponds to an octant having at least a portion of the 3D object's point cloud is referred to as a non-empty node, while an empty node corresponds to an octant that does not have any portion of the 3D object's point cloud. In the example of FIGS. 1A-1C, only two of the Level 1 octants contain at least a portion of the 3D object's point cloud, so only those corresponding Level 1 nodes in FIG. 1B (labeled non-empty Node 1 and non-empty Node 2) have a value of 1.

As shown in FIG. 1B, each non-empty Level 1 node (i.e., a Level 1 node having a value of 1) is represented in FIG. 1B by eight Level 2 nodes, each of which has a value of 1 if the corresponding Level 2 octant in FIG. 1A contains at least a portion of the 3D object's point cloud; otherwise, a value of 0, and so on down to Level (N–1) nodes (not represented in FIG. 1B). In FIG. 1B, Node 3 is the first non-empty Level 2 node for non-empty Level 1 Node 1.

Note that the eight next-lower-level octants for each octant are represented in a known order (e.g., left to right, then front to back, then top to bottom) in the nodal representation of FIG. 1B, so that the destination knows how to reconstruct the 3D object's point cloud from the octree 120.

FIG. 1C is a tabular representation 130 of the octree 120 of FIG. 1B. As shown in table 130, each non-empty node in FIG. 1B is represented by an occupancy byte that identifies the occupancy (i.e., emptiness or non-emptiness) of the eight corresponding next-level nodes. Thus, the Level 0 root node of FIG. 1B has an occupancy byte of (00100010) indicating the two non-empty Level 1 nodes of FIG. 1B (i.e., Nodes 1 and 2). Similarly, Level 1 Node 1 has an occupancy byte of (00011100) indicating the three corresponding non-empty Level 2 nodes of FIG. 1B (which include Node 3). Likewise, Level 1 Node 2 has an occupancy byte of (10110000) indicating the three corresponding non-empty Level 2 nodes of FIG. 1B. And Level 2 Node 3 has an occupancy byte of (00010100) indicating the two corresponding non-empty Level 3 nodes of FIG. 1B, and so on.

If a source transmits just the occupancy bytes of FIG. 1C in an order known to both the source and the destination (e.g., from left to right), then a destination that successfully receives those occupancy bytes in order will be able to decode those occupancy bytes and reconstruct the point cloud of the 3D object of FIG. 1A. If, however, those occupancy bytes arrive at the receiver out of order and/or if one or more of those occupancy bytes gets lost during transmission, then the receiver will not be able to decode the received occupancy bytes and will not be able to reconstruct the 3D object's point cloud.

To address that situation, as represented in FIG. 1C, each occupancy byte for each non-empty node has a corresponding (e.g., incrementing) index value that is transmitted along with the occupancy byte to enable a receiver to (i) reorder occupancy bytes that arrive out of order and (ii) identify lost occupancy bytes. When the occupancy bytes are transmitted using a reliable transport mechanism, such as (without limitation) the packet-based Transmission Control Protocol (TCP), the destination is able to request re-transmission by the source of any occupancy bytes determined to be lost based on missing index values, thereby enabling the destination successfully to receive and decode the entire octree to reconstruct the 3D object's point cloud. Note that some types of reliable transport mechanisms may rely on error-correction coding, in addition to or instead of re-transmission, to recover from lost or corrupted octree data.

In the presence of network disruptions, packet losses increase. The side effect of a reliable transport mechanism such as TCP is that, as the destination tries to recover all lost packets, using TCP can potentially result in the rendering of point clouds at the destination being delayed, thereby detracting from the user experience. Decoding an incomplete octree (i.e., an octree having at least one missing occupancy byte) is impossible since a node can have any number of bits set in its occupancy byte. If even a single occupancy byte in any level above Level (N–1) is lost, it is impossible to determine the parent-child relationships for the rest of the octree.

In an N-level octree representation of an object, the bottom-most level (i.e., Level (N–1)) has the same number of non-empty nodes as the number of points in the object's point cloud. In many instances, an octree may have one or more bottom-most levels where the number of nodes in each level is equal to the number of points in the point cloud. When there are two or more such bottom-most levels, each node has only one child, such that there is a one-to-one relationship between the nodes of such adjacent levels. It follows that losses happening in these bottom levels are not critical for decoding the rest of the octree since the destination can accurately determine which nodes are children of a lost node. Based on analysis of a few datasets, the total number of nodes in the bottom-most levels depends on the resolution of the octree. With a conservative resolution, almost 70% of the nodes are in the bottom-most levels (which, in some cases, is just the last level). As the resolution increases, this share increases. This disclosure enables loss-resilient octree transmission by separating its transmission in two parts, where the higher levels use or leverage a reliable transport mechanism, such as TCP, while the bottom-most levels (accounting for most of the traffic) can be transmitted non-reliably. As referred to herein, non-reliable levels are one or more lower levels of an octree where each level has a number of nodes equal to the number of points in the point cloud.

The ability to use a non-reliable transport protocol for the transmission of certain point-cloud data is based on the observation that some of the bottom-most levels of an octree can be decoded even when some occupancy bytes are lost. According to certain embodiments of the disclosure, point-cloud data is encoded as an octree which is in turn converted into two parts. One part includes lower-level, non-reliable levels, and the other part includes the rest of the octree, which are reliable levels. As used herein, reliable levels are transmitted using a reliable transport mechanism, while non-reliable levels are transmitted using a transport mechanism that does not guarantee reliability.

Figure 2:
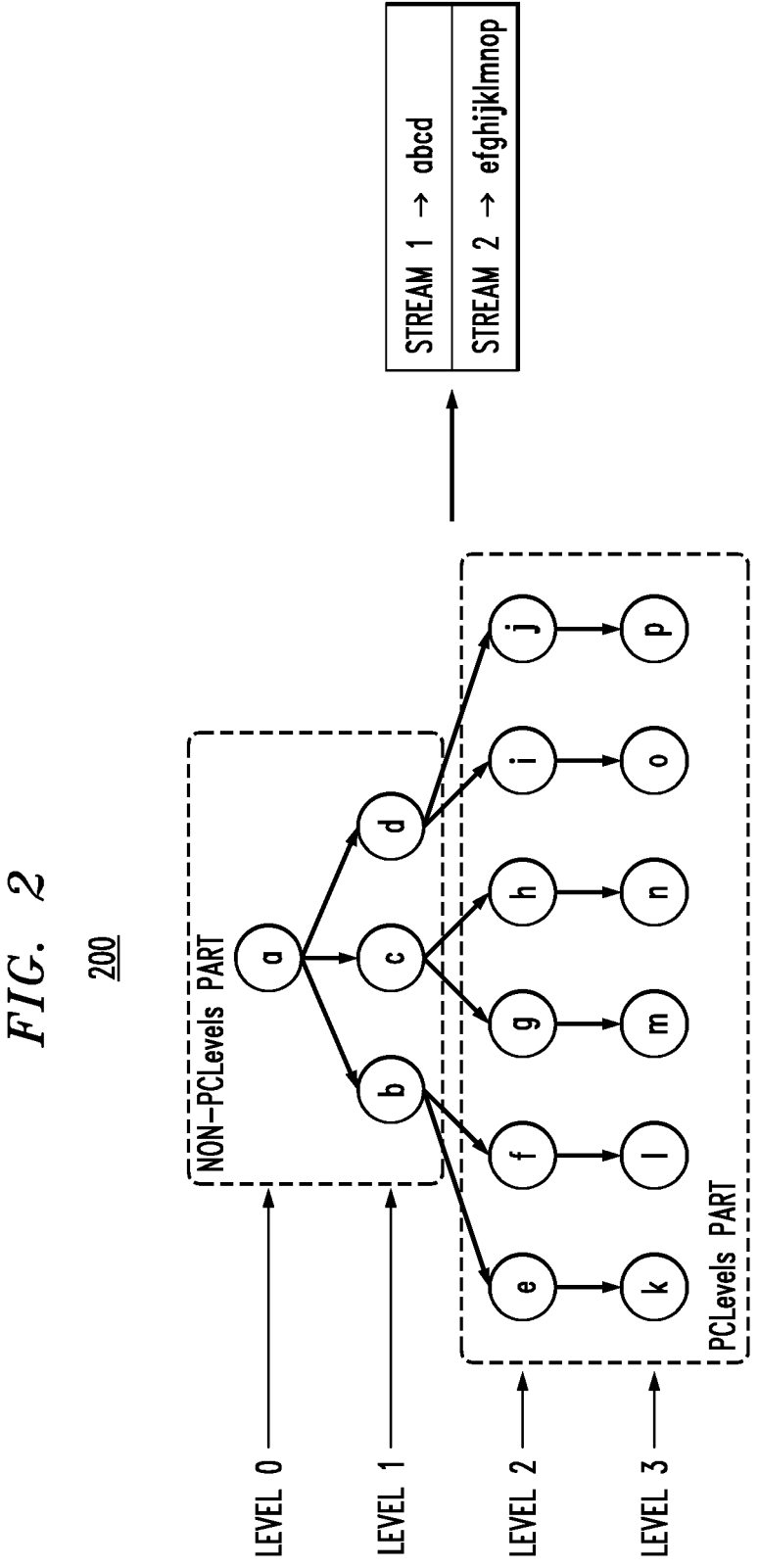
FIG. 2 is a graphical representation of a simple, four-level octree.

FIG. 2 is a graphical representation of a simple, four-level octree 200 for an object whose point cloud has six points, where Level 0 has a single non-empty node (Node a), Level 1 has three non-empty nodes (Nodes b-d), Level 2 has six non-empty nodes (Nodes e-j), and Level 3 also has six non-empty nodes (Nodes k-p), where the number of nodes in each of Levels 2 and 3 is equal to the number of points in the object's point cloud. As such, Levels 2 and 3 are non-reliable levels, while Levels 0 and 1 are reliable levels.

As a result of the one-to-one correspondence between the Level 2 nodes and the Level 3 nodes, if some of the Level 2 data is lost during transmission (and not re-transmitted), the destination may still be able to decode some of the Level 2 and 3 octree data that is not lost. For example, if the occupancy byte for Level 2 Node g is lost, then the destination will not be able to decode even a successfully received occupancy byte for the corresponding Level 3 Node m, but the destination will be able to decode the successfully received occupancy bytes for the other Level 2 and Level 3 nodes. Thus, the destination will not be able to reconstruct the portion of the 3D object's point cloud corresponding to Level 2 Node g and Level 3 Node m, but the receiver will be able to reconstruct the portions of the 3D object's point cloud corresponding to the other Level 2 and Level 3 nodes, which may still provide a satisfactory user experience. Note that, if any of the octree data in Level 0 or Level 1 gets lost, then none of the lower-level data of Levels 2 and 3 will be able to be successfully decoded.

According to certain embodiments of the present disclosure, for an N-level octree, a source transmits the octree data corresponding to higher-level reliable levels (i.e., Levels 0 to j, where $0 \leq j < N-1$) (e.g., Levels 0 and 1 of FIG. 2) using a reliable transport mechanism, but uses a non-reliable transport mechanism to transmit lower-level non-reliable level data (i.e., Levels j+1 to N−1) (e.g., Levels 2 and 3 of FIG. 2). Note that, if j=N−2, then only non-reliable Level (N−1) is transmitted using a non-reliable transport mechanism. Since a non-reliable transport mechanism is used to transmit the lower-level non-reliable data, any lost or corrupted data that is not recovered will not be available for the destination to use in reconstructing the 3D object's point cloud. Nevertheless, by avoiding retransmission of lost non-reliable data, the latency involved in transmitting and processing octree data can be reduced. Since lower-level non-reliable data may constitute a significant portion of octree data, this reduction in latency can greatly improve the chances of achieving satisfactory user experience even with significant network disruptions.

The non-reliable data further has the property that occupancy bytes can be decoded as they are received regardless of the order in which they are received. This enables multithreading to simultaneously encode and decode different chunks of non-reliable data.

Encoding may happen at the source. Encoding a point cloud means constructing an octree and creating a byte stream using the occupancy byte of each non-empty node. An occupancy byte of a node describes which of the eight children's cubes of a parent cube are occupied in a 3D space. The source first encodes the reliable part of the octree. This encoded data (e.g., Stream 1 of FIG. 2) is to be reliably transmitted to a destination along with some metadata information i.e., center coordinates and side length of root node of the octree and the number of bytes belonging to each part (the reliable and non-reliable parts) of the octree. Next, the non-reliable levels of the octree are encoded. Multithreading may be used for encoding different chunks of the non-reliable data. For example, one thread can start encoding an octree level from the left side and another thread can start encoding from the right side. Further, different threads can be employed for different levels. Compared to the state of the art, the support for multithreading offered by the present disclosure has the advantage of speeding up the encoding especially in the presence of complex scenes at high resolution.

Decoding happens at the destination. Decoding a stream means looking at each received occupancy byte, figuring out what node each occupancy byte belongs to and calculating the positions (XYZ coordinates) of all the nodes so that the object can be rendered, and an output frame can be shown to the user. Decoding happens in two steps. First, the reliably transmitted Stream 1 is received and decoded to calculate the positions of all the corresponding nodes (Nodes a, b, c, and d of FIG. 2) using a conventional octree-decoding algorithm. Next, using the node positions derived from Stream 1, the destination decodes chunks of the non-reliably transmitted Stream 2 as they are received potentially using multiple threads. The decoding of a node in Stream 2 (i.e., one of Nodes e-p of FIG. 2) depends only on its parent node. For example, Node m of FIG. 2 can be decoded as long as Node g has been decoded, and this operation is independent from the decoding of all of the other nodes in Stream 2. Thus, an octree can be divided into two streams where the decoding of Stream 2 can be parallelized.

Stream 1 needs to be reliably transported from the source to the destination. This can be achieved using classic TCP or other reliable transport protocols, such as (without limitation) the Quick UPD Internet Connections (QUIC) protocol, as long as loss detection and recovery is used. For Stream 2, a less reliable (i.e., non-reliable) transport protocol (e.g., User Datagram Protocol (UDP)) can be used since the non-reliable levels have the property that partially received data can still be successfully decoded. In some implementations, in the presence of a packet loss on Stream 2, the destination decides whether to attempt a packet recovery or ignore the loss. If the number of lost packets is below a settable threshold, then no attempt at data recovery is made since the effect on the resultant video frame is negligible. If the number of lost packets exceeds such a threshold, then the destination may determine how much data to recover. The goal is to recover enough data to produce acceptable quality video frames without stalling.

FIG. 3 is a simplified block diagram of a system 300 according to certain embodiments of the present disclosure. As shown in FIG. 3, the system 300 includes source 310, which transmits, among other data, octree data to destination 330 via network 320. For example, referring to the example octree 200 of FIG. 2, the source 310 transmits (i) octree data for the reliable Levels 0 and 1 (i.e., the occupancy bytes for Nodes a-d) via a first data stream (i.e., Stream 1 of FIG. 2) using a reliable transport mechanism and (ii) octree data for the non-reliable Levels 2 and 3 (i.e., the occupancy bytes for Nodes e-p) via a second data stream (i.e., Stream 2 of FIG. 2) using a non-reliable transport mechanism. Depending on the particular implementation, the octree data may be generated at or upstream of the source 310.

Because a reliable transport mechanism is employed for Stream 1, if any occupancy bytes for Nodes a-d are lost or corrupted, then the destination 330 will request re-transmission of those bytes. If, however, any occupancy bytes for Nodes e-p, are lost or corrupted, then, because a non-reliable transport mechanism is employed for Stream 2, the destination 330 might not request re-transmission and will instead proceed as best it can with whatever Stream 2 data is successfully received and usable.

In some implementations of network 320 of FIG. 3, network disruptions tend to be bursty, where a number of consecutively transmitted occupancy bytes will be impacted (e.g., lost or corrupted). As a very simplified example, referring again to FIG. 2, if the Level 2 data is transmitted in the order (efghij) and a burst of network noise occurs such that the occupancy bytes for Node g and h are both lost, then the destination 330 will be unable to recover the point cloud data corresponding to the Level 3 Nodes m and n, which are the respective children of the Level 2 Nodes g and h. Assuming that each octant in Level 2 is divided into eight octants in Level 3 in a spatially sequential order (e.g., left to right, then front to back, then top to bottom), then the Level 3 Nodes m and n might be right next to each other or, at least, near each other in the object's point cloud. As a result, that corresponding portion of the object's point cloud will not be able to be reconstructed by the destination 330. As such, nodes in an octree that are close together form a neighborhood and packing them together in packets poses a risk of severe quality deterioration for nearby objects in the presence of packet losses.

It is indeed better for the overall quality of the decoded video if the degradation is not localized but evenly spread throughout a video frame. Conventional technologies do not suffer from this concern since they require all data of an octree to be reliably transmitted and received, which in turn can increase end-to-end latency in the presence of challenging network conditions. To address this concern, in certain embodiments of the present disclosure, bits are randomly selected from an octree level when forming packets. By adopting this approach, each packet contains partial data from various locations within a frame, rather than grouping nearby objects together. Consequently, the loss of a packet or successive packets does not significantly impact any specific portion of the frame. Instead, the degradation is evenly distributed, hence reduced, across the entire frame, mitigating the localized impact on nearby objects. To ensure the appropriate alignment of bits during decoding, the seed of the pseudo-random number generator used by the source is shared (reliably) with the destination. This enables the destination to align the received bits correctly before grouping them together to reconstruct the nodes.

As a simple example and referring to FIG. 2, instead of transmitting the Level 2 data in the sequence (efghij), the occupancy bytes in each level are transmitted in a randomized (but known) order. In that case, if and when bursty network noise occurs, the portions of the object's point cloud that cannot be reconstructed will more likely be randomly distributed over the portions of the object's point cloud that can be successfully reconstructed, thereby providing a better user experience. For example, if the "randomized" sequence (egifhj) were used for the Level 2 data of FIG. 2, a burst of network noise starting at the third occupancy byte might result in the occupancy bytes for Nodes i and f being lost, which would be more likely to be separated in space in the object's point cloud than Nodes g and h.

As described above with respect to FIGS. 1A-1C, the source 310 of FIG. 3 transmits each occupancy byte with an index value that the destination 330 can use to determine whether an occupancy byte has been lost. Note that the theoretical maximum number of non-empty nodes for each level is known. In particular, Level 0 always has 1 (i.e., $8^0$) non-empty node, Level 1 can have up to 8 (i.e., $8^1$) non-empty nodes, Level 2 can have up to 64 (i.e., $8^2$) non-empty nodes, and Level 3 can have up to 512 (i.e., $8^3$) non-empty nodes. In general, Level j can have up to $8^j$ non-empty nodes.

In some implementations, each octree level is assigned a particular, unique sequence of possible index values. For example, in one possible implementation, Level 0 may be assigned the index value 0, Level 1 may be assigned the sequence of 1 to 8 for its 8 possible index values, Level 2 may be assigned the sequence of 9 to 72 for its 64 possible index values, Level 3 may be assigned the sequence of 73 to 584 for its 512 possible index values, and so on up to Level (N−1). Note that this is just one possible way to assign sequences of index values to different octree levels. Those skilled in the art will understand that other suitable ways are also possible.

The first non-empty node in Level 1 will be assigned the index value 1, the second non-empty node in Level 1, if it exists, will be assigned the index value 2, and so on for each non-empty node in Level 1 up to the index value 8 if needed. Similarly, the first non-empty node in Level 2 will be assigned the index value 9 (whether or not the index value 8 is used in Level 1), the second non-empty node in Level 2, if it exists, will be assigned the index value 10, and so on for each non-empty node in Level 2 up to the index value 72 if needed. The first non-empty node in Level 3 will be assigned the index value 73 (whether or not the index value 72 is used in Level 2), the second non-empty node in Level 3, if it exists, will be assigned the index value 74, and so on for Level 3 up to index value 584 if needed. And so on down to Level (N−1) for an N-level octree.

In this way, the destination 330 will be able to use the index value to identify the octree level for each received occupancy byte and will also be able to determine if any occupancy bytes are lost. Note that the network indexes its packets separately from the indices assigned to the occupancy bytes. The indices of the occupancy bytes are assigned at the application, and are used by the application to know where the received data should go in the octree. When data is transmitted, multiple occupancy bytes are typically packed into each network packet. The transport protocol assigns sequential numbers to the transmitted packets. The transmission reliability (if any) is enforced by the transport protocol. If a packet is received with an out-of-order index, the destination will know that the intermediate packet is either delayed or lost, and will handle it accordingly. The application will decode and render the data that it receives from the network.

When employing a non-reliable transport protocol, the occurrence of frequent packet losses due to adverse network conditions may lead to the generation of low-resolution decoded frames. In such cases, machine-learning (ML) techniques like Super Resolution can be used to enhance the resolution of the decoded frames. An interesting tradeoff arises between utilizing ML or the transport protocol to recover lost data. This tradeoff depends on the amount of lost data, the network latency between source and destination, and the time required by a ML algorithm for enhancing the video resolution.

FIG. 4 is a simplified hardware block diagram of an example component 400 that can be used to implement each of the source 310 and the destination 330 of FIG. 3. As shown in FIG. 4, the component 400 includes (i) communication hardware (e.g., wireless, wireline, and/or optical transceivers (TRX)) 402 that supports communications with other components, (ii) a processor (e.g., CPU microprocessor) 404 that controls the operations of the component 400, and (iii) a memory (e.g., RAM, ROM) 406 that stores code executed by the processor 404 and/or data generated and/or received by the component 400.

Although the present disclosure has been described in the context of octree representation in which a cubic space, where each higher-level, cubic octant is divided into eight, equally sized, cubic octants, the disclosure is not so limited. In general, a source can progressively divide a 3D space of any suitable shape into any suitable number of smaller spaces of any suitable sizes and shapes as long as the destination is aware of the scheme. Unless explicitly recited otherwise, as used in the claims, the term "tree representation" refers generically to both octree representations and other non-octree representations of this disclosure.

As used herein, the term "reliable transport mechanism" refers to a transport mechanism that guarantees successfully transmission of all bytes of data from the source to the destination, for example, by supporting re-transmission of lost or corrupted bytes and/or by using error-correction coding that can recover lost or corrupted data, while the term "non-reliable transport mechanism" refers to a transport mechanism that does not guarantee successful transmission of all bytes of data from the source to the destination. With a non-reliable transport mechanism, lost or corrupted data might not be re-transmitted or corrected.

In certain embodiments, the present disclosure is a machine-implemented method for transmitting a multi-level tree representation of a three-dimensional point cloud, the method comprising (i) transmitting higher-level data of the tree representation using a reliable transport mechanism and (ii) transmitting lower-level data of the tree representation using a non-reliable transport mechanism.

In at least some of the above embodiments, the higher-level data is reliable data, and the lower-level data is non-reliable data.

In at least some of the above embodiments, the lower-level data corresponds to one or more bottom levels in the tree representation, and a number of nodes in each of the one or more bottom levels is equal to a number of points in the point cloud.

In at least some of the above embodiments, the lower-level data corresponds to at least two bottom levels in the tree presentation.

In at least some of the above embodiments, the lower-level data is reordered lower-level data to spread burst noise over the point cloud.

In at least some of the above embodiments, each level in the tree representation has a unique sequence of possible index values for the level's occupancy data.

In at least some of the above embodiments, the method further comprises generating the tree representation based on the point cloud.

In at least some of the above embodiments, the tree representation is an octree representation.

In certain other embodiments, the present disclosure is a machine-implemented method for receiving a multi-level tree representation of a three-dimensional point cloud, the method comprising (i) receiving higher-level data of the tree representation via a reliable transport mechanism and (ii) receiving lower-level data of the tree representation via a non-reliable transport mechanism.

In at least some of the above embodiments, the higher-level data is reliable data, and the lower-level data is non-reliable data.

In at least some of the above embodiments, the lower-level data corresponds to one or more bottom levels in the tree representation, and a number of nodes in each of the one or more bottom levels is equal to a number of points in the point cloud.

In at least some of the above embodiments, the lower-level data corresponds to at least two bottom levels in the tree presentation.

In at least some of the above embodiments, the lower-level data is reordered lower-level data to spread burst noise over the point cloud.

In at least some of the above embodiments, each level in the tree representation has a unique sequence of possible index values for the level's occupancy data.

In at least some of the above embodiments, the method further comprises decoding the tree representation to reconstruct the point cloud.

In at least some of the above embodiments, the tree representation is an octree representation.

Although not explicitly shown in the figures, each node in the figures has at least one processor (e.g., a CPU) for processing incoming and/or outgoing data, memory (e.g., RAM, ROM) for storing data and (in some implementations) program code to be executed by the processor, and communication hardware (e.g., transceivers) for communicating with one or more other nodes.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits. The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1-only A; 2-only B; 3-both A and B.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A machine-implemented method for transmitting a multi-level tree representation of a three-dimensional (3D) telepresence point cloud for a 3D object, the method comprising:

a transmitter generating the tree representation of the 3D telepresence point cloud for the 3D object;

the transmitter transmitting higher-level, reliable 3D telepresence data of the tree representation to a receiver using a reliable transport mechanism, wherein lost higher-level, reliable 3D telepresence data needs to be retransmitted; and the transmitter transmitting lower-level, unreliable 3D telepresence data of the tree representation to the receiver using a non-reliable transport mechanism, wherein:

lost lower-level, unreliable 3D telepresence data does not need to be retransmitted;

the lower-level, unreliable 3D telepresence data corresponds to two or more bottom levels in the tree representation;

a number of nodes in each of the two or more bottom levels is equal to a number of points in the 3D telepresence point cloud; and the nodes in the two or more bottom levels have a one-to-one correspondence.

2. The method of claim 1, wherein the lower-level data is reordered lower-level data to spread burst noise over the point cloud.

3. The method of claim 1, wherein each level in the tree representation has a unique sequence of possible index values for the level's occupancy data.

4. The method of claim 1, wherein the tree representation is an octree representation.

5. The method of claim 1, wherein the transmitter strategically discards some of the 3D telepresence data.

6. A transmitter for transmitting a multi-level tree representation of a three-dimensional (3D) telepresence point cloud for a 3D object, the transmitter comprising at least one processor; and at least one memory storing instructions that, upon being executed by the at least one processor, cause the transmitter at least to:

generate the tree representation of the 3D telepresence point cloud for the 3D object;

transmit higher-level, reliable 3D telepresence data of the tree representation to a receiver using a reliable transport mechanism, wherein lost higher-level, reliable 3D telepresence data needs to be retransmitted; and transmit lower-level, unreliable 3D telepresence data of the tree representation to the receiver using a non-reliable transport mechanism, wherein:

lost lower-level, unreliable 3D telepresence data does not need to be retransmitted;

the lower-level, unreliable 3D telepresence data corresponds to two or more bottom levels in the tree representation;

a number of nodes in each of the two or more bottom levels is equal to a number of points in the 3D telepresence point cloud; and the nodes in the two or more bottom levels have a one-to-one correspondence.

7. The transmitter of claim 6, wherein the lower-level data is reordered lower-level data to spread burst noise over the point cloud.

8. The transmitter of claim 6, wherein each level in the tree representation has a unique sequence of possible index values for the level's occupancy data.

9. The transmitter of claim 6, wherein the tree representation is an octree representation.

10. The transmitter of claim 6, wherein the transmitter is configured to strategically discard some of the 3D telepresence data.

11. A machine-implemented method for receiving a multi-level tree representation of a three-dimensional (3D) telepresence point cloud for a 3D object, the method comprising:

a receiver receiving higher-level, reliable 3D telepresence data of the tree representation from a transmitter via a reliable transport mechanism, wherein lost higher-level, reliable 3D telepresence data needs to be retransmitted;

the receiver receiving lower-level, unreliable 3D telepresence data of the tree representation from the transmitter via a non-reliable transport mechanism, wherein lost lower-level, unreliable 3D telepresence data does not need to be retransmitted; and the receiver decoding the tree representation to reconstruct the 3D telepresence point cloud for the 3D object, wherein:

the lower-level, unreliable 3D telepresence data corresponds to two or more bottom levels in the tree representation;

a number of nodes in each of the two or more bottom levels is equal to a number of points in the 3D telepresence point cloud; and the nodes in the two or more bottom levels have a one-to-one correspondence.

12. The method of claim 11, wherein the lower-level data is reordered lower-level data to spread burst noise over the point cloud.

13. The method of claim 11, wherein each level in the tree representation has a unique sequence of possible index values for the level's occupancy data.

14. The method of claim 10, wherein the tree representation is an octree representation.

15. A receiver for receiving a multi-level tree representation of a three-dimensional (3D) telepresence point cloud for a 3D object, the receiver comprising:

at least one processor; and at least one memory storing instructions that, upon being executed by the at least one processor, cause the receiver at least to:

receive higher-level, reliable 3D telepresence data of the tree representation from a transmitter via a reliable transport mechanism, wherein lost higher-level, reliable 3D telepresence data needs to be retransmitted;

receive lower-level, unreliable 3D telepresence data of the tree representation from the transmitter via a non-reliable transport mechanism, wherein lost lower-level, unreliable 3D telepresence data does not need to be retransmitted; and decode the tree representation to reconstruct the 3D telepresence point cloud for the 3D object, wherein:

the lower-level, unreliable 3D telepresence data corresponds to two or more bottom levels in the tree representation;

a number of nodes in each of the two or more bottom levels is equal to a number of points in the 3D telepresence point cloud; and the nodes in the two or more bottom levels have a one-to-one correspondence.

16. The receiver of claim 15, wherein the lower-level data is reordered lower-level data to spread burst noise over the point cloud.

17. The receiver of claim 15, wherein each level in the tree representation has a unique sequence of possible index values for the level's occupancy data.

18. The receiver of claim 15, wherein the tree representation is an octree representation.

* * * * *